United States Patent [19]

McDermott et al.

[11] 4,393,634

[45] Jul. 19, 1983

[54] ROOFING SYSTEM AND NEEDLE PUNCHED IMPREGNATED SYNTHETIC FIBER FABRIC

[75] Inventors: Thomas R. McDermott, Franklin, Mass.; Robert K. Jackson, Spofford, N.H.

[73] Assignee: Clark-Cutler-McDermott Company, Franklin, Mass.

[21] Appl. No.: 164,806

[22] Filed: Jun. 30, 1980

[51] Int. Cl.³ .................... B32B 5/24; B32B 11/10; E04C 1/00

[52] U.S. Cl. .................... 52/309.1; 52/408; 428/291; 428/300; 428/301; 428/489

[58] Field of Search .............. 52/309.1, 408, 410, 52/409; 28/112; 428/300, 301, 489

[56] References Cited

U.S. PATENT DOCUMENTS

| | | | |
|---|---|---|---|
| 2,158,533 | 5/1939 | Cavey | 28/112 |
| 3,199,167 | 8/1965 | Charlton | 28/112 |
| 3,328,232 | 6/1967 | Dunn | 52/309.1 |
| 3,369,956 | 2/1968 | Schuetz | 52/309.1 |
| 3,474,625 | 10/1969 | Draper | 52/309.1 |
| 3,505,770 | 4/1970 | Bennett | 52/408 |
| 3,856,602 | 12/1974 | Colijn | 28/112 |
| 3,965,633 | 6/1976 | Carroll | 52/410 |
| 3,967,032 | 6/1976 | Plotz | 428/301 |
| 4,035,544 | 7/1977 | Iwasaki | 428/301 |
| 4,186,236 | 1/1980 | Heitmann | 428/489 |
| 4,230,762 | 10/1980 | Iwasaki | 428/300 |
| 4,237,180 | 12/1980 | Jaskowski | 28/112 |
| 4,259,127 | 3/1981 | Schachter | 428/489 |
| 4,291,086 | 9/1981 | Auten | 428/489 |

Primary Examiner—Reinaldo P. Machado
Attorney, Agent, or Firm—Charles E. Pflund

[57] ABSTRACT

A needle punched synthetic fabric of polyester fibers is impregnated with asphalt emulsion which is absorbed in an amount to approximately double the weight of the needled fabric. There is no fiber-free agglomoration of asphalt and the impregnated fabric is flexible and relatively immune to concentrated impact loads even at freezing temperature. It can be made waterproof for a single membrane built up roof by application of asphalt emulsion or hot-mopped asphalt and in such applications has properties acceptable under existing fire simulation tests. Other synthetic fibers such as nylon or polyester-nylon mixes can be used.

18 Claims, 5 Drawing Figures

ROOFING SYSTEM AND NEEDLE PUNCHED IMPREGNATED SYNTHETIC FIBER FABRIC

BACKGROUND OF THE INVENTION

Roofing systems are well known in which a roof deck supports thereon a plurality of layers of materials for forming a finished waterproof roof surface over an enclosed space. In commercial structures and other relatively flat roof structures, various materials are known and used in combinations thereon for building up a finished roof on such structures as specified in the trade. Generally the roof deck supports an insulation layer of fiberboard or the like which provides a rigid, continuous, flat, upper surface on which a roof covering is applied. One of the well known forms of building up a roof covering is to mop on hot asphalt and apply roofing "felt" in multiple layers to provide the necessary strengths and impermeability to rain water required for a satisfactory roof.

Conventional built-up roofs have a number of shortcomings. The application of three or more layers of roofing felt by mopping on with hot asphalt is a time consuming and labor intensive task which adds considerable expense to the finished structure. The roofing felt is a relatively brittle material which cannot be unrolled from the roll when the roll is cold and hence operation in cold weather or repairs during emergencies in cold weather are difficult. Furthermore, the multiple layers of roofing felt plus the mopped on asphalt amounts to a large mass of inflammable molten material in the event of a fire which would heat the roof to the point of pooling and dripping of free asphalt from the composite layers to further feed the fire within the building. Furthermore, such a roof is fragile with respect to impact strength and thus can be damaged by hail. Such roofs also have poor lateral flexibility so the ordinary expansion and contraction due to ambient temperature changes will, over a period of time, result in cracking and allow water leakage. Similar problems occur when workmen walk on such a roof and cause some degree of deflection of the supporting structure.

An additional expense in installing such a roof is involved with extending the roof felt layers through a right angle corner. The standard practice is to install a wooden cant in the form of a rip sawed square timber to fit in the corner before the roofing layers are applied so that the right angle bend is traversed through two successive forty-five degree angle bends. In addition, at the usual places on a roof, separate flashing materials are required because of the limited capability of roofing felt to bend around corners or be durable enough to survive in valleys between gable surfaces and the like.

Alternate forms of roof covering include elastomeric compounds in the form of thin membranes such as the Sure-Seal (TM) material sold by Carlisle Tire & Rubber Co. as a roof covering. Both the standard asphalt felt as well as rubber and other composite membrane roof converings are described, for example, in the 1980 Factory Mutual Approval Guide for building materials and construction, pp 442–461. Rubberized roof and gutter coverings are generally required to be covered with loose stone or otherwise protected from oxidation and deterioration from the ultraviolet exposure to sunlight and to avoid abrasion or puncturing where the roof has occasional maintenance traffic of workers thereon.

SUMMARY OF THE INVENTION

The present invention in its preferred embodiment provides a novel roofing system in which a novel single layer of asphalt impregnated needled fabric composed essentially of synthetic fibers can be laid on with either a hot mopped or emulsion system adhesive then covered with a similar hot mopped or emulsion system waterproof coating. The system uses a novel article of manufacture provided by the invention in the form of a flexible needled fabric impregnated with an asphalt emulsion where the fabric is preferably composed of polyester fibers of medium to course denier. This roof covering has the unusual properties of high tensile strength while providing some lateral flexibility so that expansion and contraction due to temperature changes do not result in cracks or deteriorate the finished roof. The fabric is relatively impervious to impact loads such as heavy hail, windborn branches or debris or the heel of workmens' boots when they walk on the finished roof. The flexibility of the membrane permits it to be laid into right angled corners without cracking and it maintains its flexibility in cold weather to permit cold weather installation as well as cold weather repair of damaged roofs. The rolls of material as sold require no heated storage or pre-heating for unrolling purposes at temperatures well below freezing. Using only a single layer of the new material results in substantial labor and material savings as compared to the multi-ply mopped on roof construction employing asphalt and roofing felts which are usually applied in three or more layers.

The roofing system and material provided for the roof covering by this invention have desirable fire-resistant properties. Thus the industry standard calorimeter test in which an enclosure with the roofing system under test forming the top surface thereof is subjected to an internal fire shows that where the roof deck fails and the actual flame burns through to the roof covering the impregnated fabric of the present invention will not release objectionable quantities of molten asphalt to drip down into the enclosure and increase the fuel value by feeding the flame. Similarly, at edges of an inclined roof during a hot fire in the building no burning free-flowing asphalt appears to drip because of the liquid retention property of the fabric of the present invention. Furthermore, the "burning brand" exterior fire exposure test consisting of a blazing hardwood latice placed on top of one end of the 4'×8' test roof panel and fanned by a horizontal twelve mile per hour wind shows a better than "passing" burn rate because the fabric inhibits the flow of molten asphalt into the area of combustion. These characteristics of the novel roof covering provided by the invention are believed to be the result of the fiber lattice provided by the basic needle punched fabric which retains the asphalt by absorption. The density and proximity of fibers restricts the flow of high viscosity liquid in the manner of a sponge. Thus at high temperatures the flow of free asphalt is restricted. The same feature also acts to hold the asphalt in place on steeply pitched roofs even when they are exposed to high temperatures caused by direct sunlight. The flexibility is adequate to use the membrane as flashing material including sharp right angle bends as previously stated. The membranes' resilience prevents fracture from impact and permits deflection such as may be occasioned by loads on a board roof deck underlying the membrane and this resilience is retained at zero degrees fahrenheit weather or colder.

Accordingly, it is an object of the present invention to provide an improved roofing system employing a novel article of manufacture in the form of a needled synthetic fiber fabric which has been impregnated from an asphalt emulsion to produce a flexible, tough, extendable, high tensile product with fire resistance and impact damage resistance capable of providing all of the aforesaid properties. In addition, the roofing system can be completed with a minimum amount of manual labor and conveniently during adverse conditions such as extremely cold weather.

DESCRIPTION OF THE PREFERRED EMBODIMENT

Figure 1:
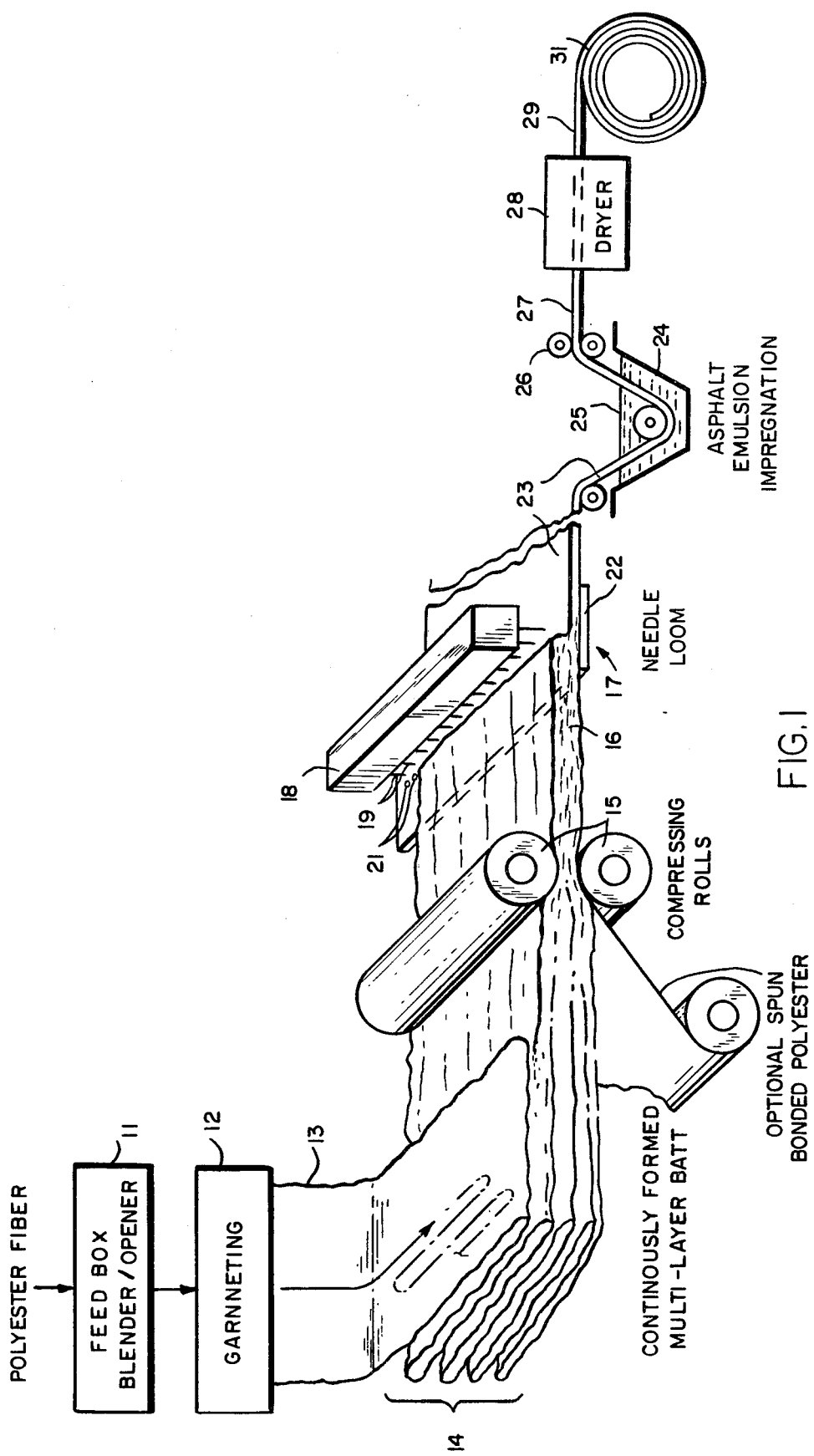
FIG. 1 is a pictorial view representing in schematic form a method for making the improved impregnated needle punched fabric of the invention.

Referring to FIG. 1, the preferred method for making the improved roof covering article of manufacture in accordance with the invention will be described. FIG. 1 is a schematic view partly in perspective and partly in elevation representative of one form of continuous process. The process starts by feeding the polyester fiber, or polyester and other fiber mix, into a reservoir feed box 11 which may include blending and opening the fiber mass to supply it at a controlled, uniform rate to a garneting machine 12 where the fibers are combed into a more or less parallel orientation. The garneting machine feeds a continuous, wide, thin layer 13 of fibers in a fragile web to a "camel back" or other such device (not shown) which layers the continuously fed web 13 into a multi-layer mat 14 by back and forth travel of the feed mechanism. The mat 14 is supported on a feed belt, not shown, which transports the continuously produced mat layers 14 in a direction transverse to the layering direction and preferably through compressing rolls 15 where the thickness of the mat 14 is reduced to approximately half its thickness at the exit of the rolls where it is still relatively fragile and continuously supported. The compacted web 16 is then fed to a conventional needle loom 17 which has a vertically reciprocating header bar 18 supporting a large plurality of barbed needle loom needles 19, each of which projects through a closely fitting perforation 21 in a perforated plate 22. The compacted web 16 passes through the needle loom 17 and the plurality of needle punches caused by the vertical reciprocation of the header bar 18 produces transverse fiber projections carried through the fabric to produce at the output of the needle loom a needled fabric 23 which, by virtue of the number of needles 19 and the rate of reciprocating strokes for the header bar 18, is held together by the transverse fibers extending through the web 23 from approximately 200 or more needle punctures per square inch.

The needle punched fabric 23 emerging from the needle loom 17 will be described in greater detail with reference to FIG. 2. Its thickness is preferably slightly greater than one eighth inch and its width any convenient dimension corresponding to the width dimension of the needle loom.

The remainder of FIG. 1 is shown in elevation view, wherein the needled fabric 23 is led over an input roller into a sizing box 24 where it is immersed in an asphalt liquid emulsion 25 and exits through pinch rollers 26 where excess emulsion is squeezed out of the fabric. Exiting the pinch rolls 26 is the wet, impregnated fabric 27 which is led through a dryer 28 which may be heated "cans" or an air dryer, or both, to remove the water content. The dry, asphalt impregnated, needle loomed fabric 29 emerges from the dryer 28 and is conveniently accumulated into rolls 31 of any convenient size. The rolls 31 can be edge trimmed and slit to conventional size as commercial product at the output of the continuous process or as a subsequent operation.

Figure 2:
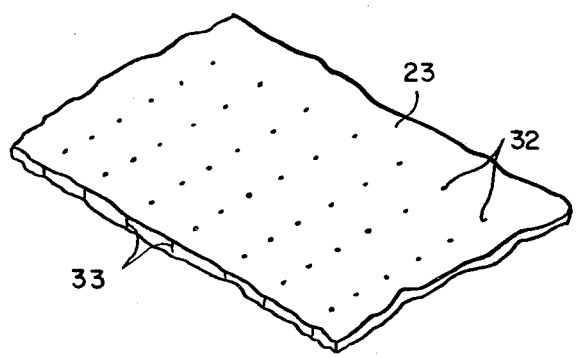
FIG. 2 is a perspective view of a quantity of the needle punched fabric used in the invention prior to asphalt impregnation.

FIG. 2 is a representation of the needle loomed synthetic fabric 23 showing the plurality of needle punches 32 which may be of any suitable density over a wide range obtained by adjusting the speed of reciprocation of the header bar 18 of the needled loom and/or the speed of travel of the input web 16. Each needle punch 32 carries fibers transversely through the fabric 23 in the form of a cluster of fibers 33 which are caught on the barbs of the needles and carried through to the other side where they remain as the needle loom is extracted on the return stroke with the smooth direction of the barbs on the needles freely passing out of the fabric 23. In this condition, fabric 23 has, for example, approximately 250 penetrations per square inch or greater such that a three-inch sample has a "grab tensile" strength of approximately 35–70 pounds. The fabric 23 is soft and flexible and can extend both in the direction of travel and transverse thereto although its dimensional extension is slightly greater in the direction in which the fabric passed through the needle loom. A typical weight for the fabric 23 would be ten ounces per square yard made from 8 ply bats 14.

Figure 3:
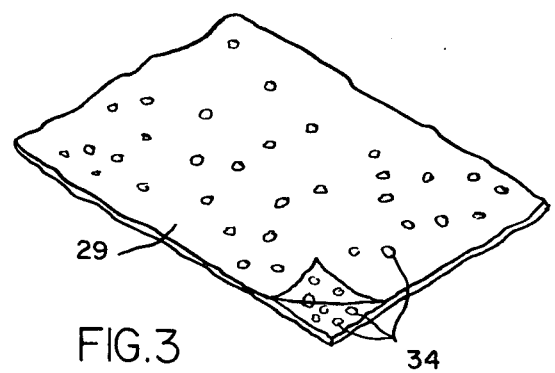
FIG. 3 is a perspective view of the sample of the asphalt impregated needle punched fabric of the invention.

Referring to FIG. 3, the finished article of manufacture 29 is seen to comprise the needled fabric 23 completely impregnated by having all of its fibers coated with asphalt such that its finished weight is approximately 19 ounces per square yard. The appearance of the product is thus an asphalt brown in overall color with the individual fibers being uniformly brown. The product has asphalt-bound fiber tufts 34 at the locations of the needle punch tufts that are driven through the fabric to give it its needle punched character and strength, but the fabric is essentially free of any agglomerated asphalt areas which are fiber-free.

Figure 4:
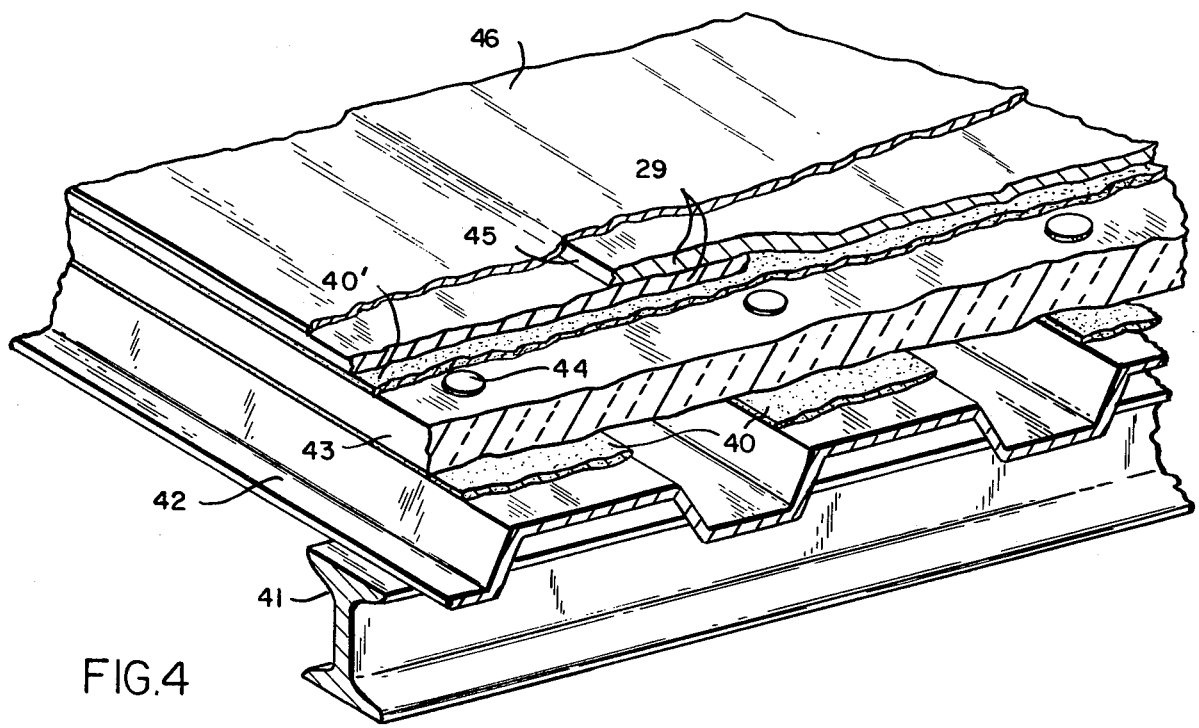
FIG. 4 is a perspective view of a roofing system constructed in accordance with the invention.

Referring to FIG. 4, a roofing system in accordance with the present invention will be described. FIG. 4 shows the basic elements of support for a so-called "flat" roof for industrial space and for the purpose of illustration can be considered representative of any roof support structure. In such roofs principal support beams or rafters 41 are spanned by a structural support member which is shown in FIG. 4 as a steel panel 42 of the trapezoid corrugated cross section configuration. The supports, of course, in a wood structure could be ordinary boards, plywood panel or other area covering structure.

The next layer on the support panel is usually an insulating panel such as Pearlite or other composite or synthetic rigid panel material. The insulating panel 43 can be secured by adhesive 40 or mechanical fasteners 44. The top surface of the insulating panel or other member having the exposed top surface is next coated with one of many options of an asphalt lap adhesive 40' in a cold emulsion system or hot mopped system application and this coated surface then has the asphalt impregnated membrane 29 laid down in strips with overlapping joints, which are themselves sealed with the asphalt lap adhesive. Once the entire roof is coated with the membrane 29 with sealed overlap joints 45 the single layer membrane 29 is coated with asphalt coating from a cold emulsion system or hot mopped system applied in sufficient quantity to saturate at least the upper lattice structure of the fabric to form a waterproof membrane 46. This asphalt coating may be of the type PR50E manufactured by Triram Corporation, Framingham, Massachusetts, or equivalent and is indicated at 46 as coating the entire roof. Once the water from this coating evaporates the roof is finished for use without further layers although crushed stone or other finish material may be applied, if desired.

Figure 5:
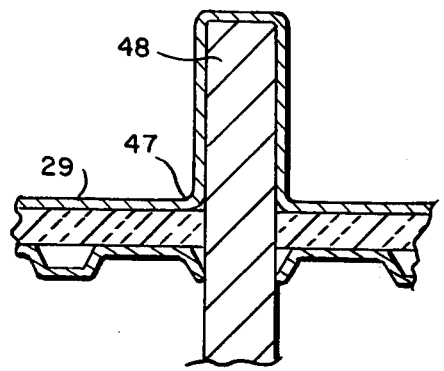
FIG. 5 is a cross section view of a roof constructed in accordance with the invention showing the ability of the roof covering to make right angle corners.

FIG. 5 shows in cross section a roof employing the impregnated fabric 29 of the invention indicating at 47 the flexibility of membrane 29 which permits right angle corners without the use of a cant strip. If desired, the roofing could be carried over projections such as a parapet 48 since the material 29 can bend at right angles for either inside or outside corners. Thus the material can readily be used without the need for additional flashing to cover any roof configuration.

While many modifications can be made in the manufactured material 29 without departing from the scope of the present invention, only a few such modifications will be presented here.

As stated, the preferred fiber is polyester which has good bulking qualities but it may also contain some nylon or other fiber which can withstand the heat to which it will be subjected. Thus, polypropylene would not be suitable where a hot asphalt mopping operation is to be employed. The low melting point for polypropylene would also cause failure in roofing installations which were required to pass the Calorimeter Fuel Contribution Test required for approval by insurance carriers.

The preferred polyester used in the invention is temperature stable at the temperature of hot asphalt and thus can be applied with hot or cold systems used in normal construction. Hot asphalt application of membrane 29, although requiring 350° F. molten asphalt with the equipment required for this purpose does not involve the delay of waiting for a solvent to evaporate before the roof can be walked on. A typical polyester is that manufactured by Eastman Kodak Company under the name of Kodel with medium (18 to 20) to coarse (25) denier and fiber length of approximately 3 inches.

The needle punching operation herein described can be performed on conventional equipment as used to make other needle punched fabrics and the number of punches per square inch can be as dense as desired. Fabric with 250 punches per square inch provide a good result and generally would be considered a minimum for dimensional stability and strength.

The asphalt emulsion 25 used in the sizing box 24 to impregnate the needled fabric 23 can be any suitable emulsion of the hard or high temperature asphalt type of which the following is a typical example:

| Composition | Percent By Volume | Weight For 300 LB Batch |
|---|---|---|
| Water | 29.5% | 88.5 |
| Englehart Minerals Co. ASP602 (a kaolin-type clay) | 18.2% | 54.6 |
| Kelzan (a cellulose gum thickener) | 9.15% | 0.45 |
| Triram hard asphalt emulsion product of Triram Inc. of Framingham, MA. | 52.15% | 156.45 |

These components should be thoroughly blended with a high speed mixer at room temperature.

In addition to a choice of synthetic fibers, the product can be manufactured using a layer of spun bonded polyester such as Cerex added to the batt before needling. This, or other equivalent additions, will give greater dimensional stability to the needled fabric 23 and thus the finished product will have less elongation under tensile stress. This additional strength and reduced elongation in the transverse dimensions of the needle fabric 23 may be preferred for some applications and will still give relative immunity to breakdown due to large temperature changes since the basic impregnated fabric has all fibers coated with asphalt rather than asphalt saturation as would be the case in a hot dip felt, for example, as previously described. This flexibility by coating each fiber is preferably to a matted asphalt structure such as found in the conventional roofing felts which, because of their asphalt content, crack under cold temperature stresses. In the final roofing system of FIG. 4, the asphalt content of the impregnated membrane 29 bonds with the underlying adhesive in the final coating of asphalt to make a unitary roof covering that is lighter weight and more durable than multi-layers of mopped on or tar paper or roofing felt. At the same time, the flexibility is maintained to accommodate cold shrinkage or other normal displacement of the working roof.

Many modifications of the exact composition of the product and other and different applications of the product will occur to those skilled in the art as being within the scope of the present invention defined by the appended claims.

We claim:

1. A roofing system comprising:
   a roofing deck having a substantially continuous top surface area extending over the space covered by the roof;
   a synthetic fiber needled fabric flexible porous layer covering said top surface, the fibers in said layer coated with asphalt but without fiber-free asphalt retained within the interstices of the fabric;
   means for adhering said flexible layer to said top surface; and
   a waterproof asphalt saturant applied in situ to the top surface of said layer to form a continuous waterproof coating which bonds by absorption in the upper lattice structure of the said fabric layer.

2. The roofing system of claim 1 wherein said synthetic fiber comprises essentially polyester fibers.

3. The roofing system of claim 1 wherein said synthetic fiber comprises essentially a polyester and nylon blend.

4. The roofing system of claim 2 wherein said polyester fibers are medium to coarse denier with length of approximately 1 to 3 inches.

5. The roofing system according to claim 1 wherein said needled fabric layer is emulsion impregnated to coat the fibers in said layer with asphalt and said layer is approximately one-eighth inch thick.

6. The roofing system according to claim 5 wherein said layer has a weight of approximately 20 ounces per square yard consisting of approximately half fiber and half asphalt by weight.

7. The roofing system according to any of claims 1 through 6 wherein said means for adhering is a coating of adhesive on said top surface and said adhesive and said waterproof asphalt coating are applied in a cold emulsion system.

8. The roofing system according to any of claims 1 through 7 wherein said means for adhering is a coating of adhesive on said top surface and said adhesive and said waterproof asphalt coating are applied in a hot mopped asphalt system.

9. A roofing membrane comprising a needled synthetic fiber fabric which is liquid impreganted to coat the fibers in said fabric with aspahlt substantially without agglomerated fiber-free asphalt retained in said fabric to produce a flexible membrane which will absorb liquid asphalt applied to the surface thereof.

10. The roofing membrane of claim 13 wherein said synthetic fiber comprises essentially polyester fibers.

11. The roofing membrane of claim 9 wherein said synthetic fiber comprises essentially a polyester and nylon blend.

12. The roofing membrane of claim 10 wherein said polyester fibers are medium to coarse denier with length of approximately 1 to 3 inches.

13. The roofing membrane of claim 9 which has a weight of approximately 20 ounces per square yard consisting of approximately half fiber and half asphalt by weight and is approximately one-eighth inch thick.

14. The roofing membrane of claim 9 having high impact strength, substantially 90° bending flexibility without cracking at freezing temperatures and asphalt retention without substantial pooling at elevated flame temperatures.

15. A new article of manufacture comprising a flexible needled fabric consisting essentially of synthetic fibers impregnated with an asphalt emulsion to coat the fibers of said fabric without substantial matting or retention of globules of fiber-free asphalt in the finished fabric.

16. The article according to claim 15 wherein said fiber is by weight approximately 50% of the weight of the finished impregnated fabric.

17. The article according to claim 15 wherein said fiber in said fabric is by weight approximately 10 ounces per square yard and needled with approximately 250 needle punches per square inch or greater and wherein the impregnation adds approximately an equal weight percent of asphalt to produce a finished fabric of approximately 19 ounces per square yard and approximately one-eighth inch thick.

18. The article according to claim 15 having incorporated to become integral with the needled fabric a layer of dimensionally stable synthetic fiber fabric.

* * * * *

UNITED STATES PATENT AND TRADEMARK OFFICE
CERTIFICATE OF CORRECTION

PATENT NO. : 4,393,634
DATED : July 19, 1983
INVENTOR(S) : Thomas R. McDermott and Robert K. Jackson It is certified that error appears in the above—identified patent and that said Letters Patent is hereby corrected as shown below:

Col. 1, lines 16-17: change "convering" to --covering--

Col. 1, line 61: change "converings" to --coverings--

Col. 3, line 21: change "impregated" to --impregnated--

Claim 9, col. 7, line 23: change "impreganted" to --impregnated--

Claim 9, col. 7, line 24: change "aspahlt" to --asphalt--

Claim 10, col. 7, line 28: change "claim 13" to --claim 9--

Signed and Sealed this

Third Day of July 1984

[SEAL]

Attest:

GERALD J. MOSSINGHOFF

Attesting Officer   Commissioner of Patents and Trademarks